(12) United States Patent
Miomo

(10) Patent No.: US 9,904,609 B2
(45) Date of Patent: Feb. 27, 2018

(54) MEMORY CONTROLLER AND MEMORY DEVICE

(71) Applicant: TOSHIBA MEMORY CORPORATION, Minato-ku (JP)

(72) Inventor: Takahiro Miomo, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 33 days.

(21) Appl. No.: 15/000,455

(22) Filed: Jan. 19, 2016

(65) Prior Publication Data

US 2017/0123694 A1 May 4, 2017

Related U.S. Application Data

(60) Provisional application No. 62/250,802, filed on Nov. 4, 2015.

(51) Int. Cl.
*G06F 3/06* (2006.01)
*G06F 11/16* (2006.01)

(52) U.S. Cl.
CPC .......... *G06F 11/167* (2013.01); *G06F 3/0611* (2013.01); *G06F 3/0659* (2013.01); *G06F 3/0679* (2013.01); *G06F 11/165* (2013.01); *G06F 3/0619* (2013.01); *G06F 3/0658* (2013.01); *G06F 3/0688* (2013.01); *G06F 2212/7208* (2013.01)

(58) Field of Classification Search
CPC ...... G06F 3/0679; G06F 3/0688; G06F 3/061; G06F 3/0655–3/0659
See application file for complete search history.

(56) References Cited

U.S. PATENT DOCUMENTS

| 7,283,405 | B2 | 10/2007 | Yamanaka et al. | |
|---|---|---|---|---|
| 8,407,407 | B1* | 3/2013 | Adler | G06F 3/0613 711/103 |
| 2010/0180105 | A1* | 7/2010 | Asnaashari | G06F 13/1642 712/226 |
| 2010/0262721 | A1* | 10/2010 | Asnaashari | G06F 13/161 710/5 |
| 2012/0084484 | A1* | 4/2012 | Post | G06F 3/061 710/308 |

(Continued)

FOREIGN PATENT DOCUMENTS

| JP | 4214978 | 1/2009 |
|---|---|---|
| JP | 2010-134628 | 6/2010 |

*Primary Examiner* — Edward Dudek, Jr.
*Assistant Examiner* — Andrew Russell
(74) *Attorney, Agent, or Firm* — Oblon, McClelland, Maier & Neustadt, L.L.P.

(57) ABSTRACT

According to one embodiment, a memory controller includes a first controller issuing one command which includes read commands for reading data from a nonvolatile memory, a second controller sequentially issuing the read commands and a dummy command which continues the read commands when the one command is received, and a third controller sequentially executing the read commands and the dummy command and informing an information of a read error to the second controller when the read error occurred, the second controller informing a completion of the one command to the first controller when the command which corresponds to the read error is the dummy command.

20 Claims, 8 Drawing Sheets

(56) References Cited

U.S. PATENT DOCUMENTS

| | | | |
|---|---|---|---|
| 2013/0262745 A1* | 10/2013 | Lin | G06F 3/061 |
| | | | 711/103 |
| 2014/0149807 A1* | 5/2014 | Huang | G06F 3/061 |
| | | | 714/51 |
| 2015/0058528 A1 | 2/2015 | Lasser | |
| 2016/0162186 A1* | 6/2016 | Kashyap | G06F 3/061 |
| | | | 711/103 |
| 2016/0283111 A1* | 9/2016 | Guo | G06F 3/061 |

* cited by examiner

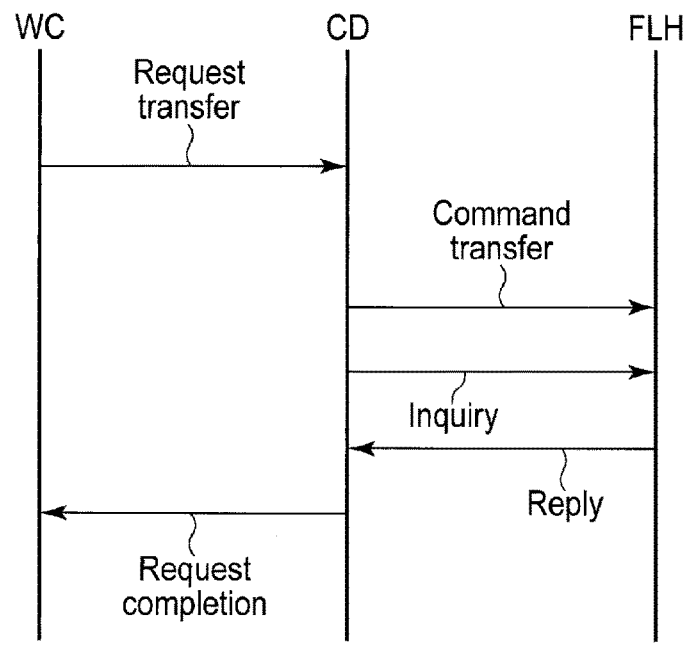
F I G. 5
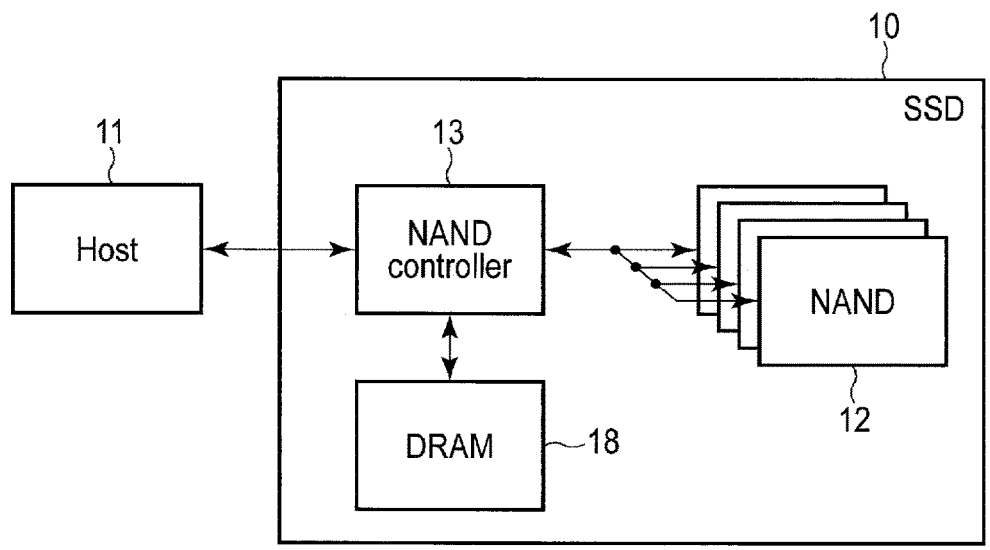
F I G. 9

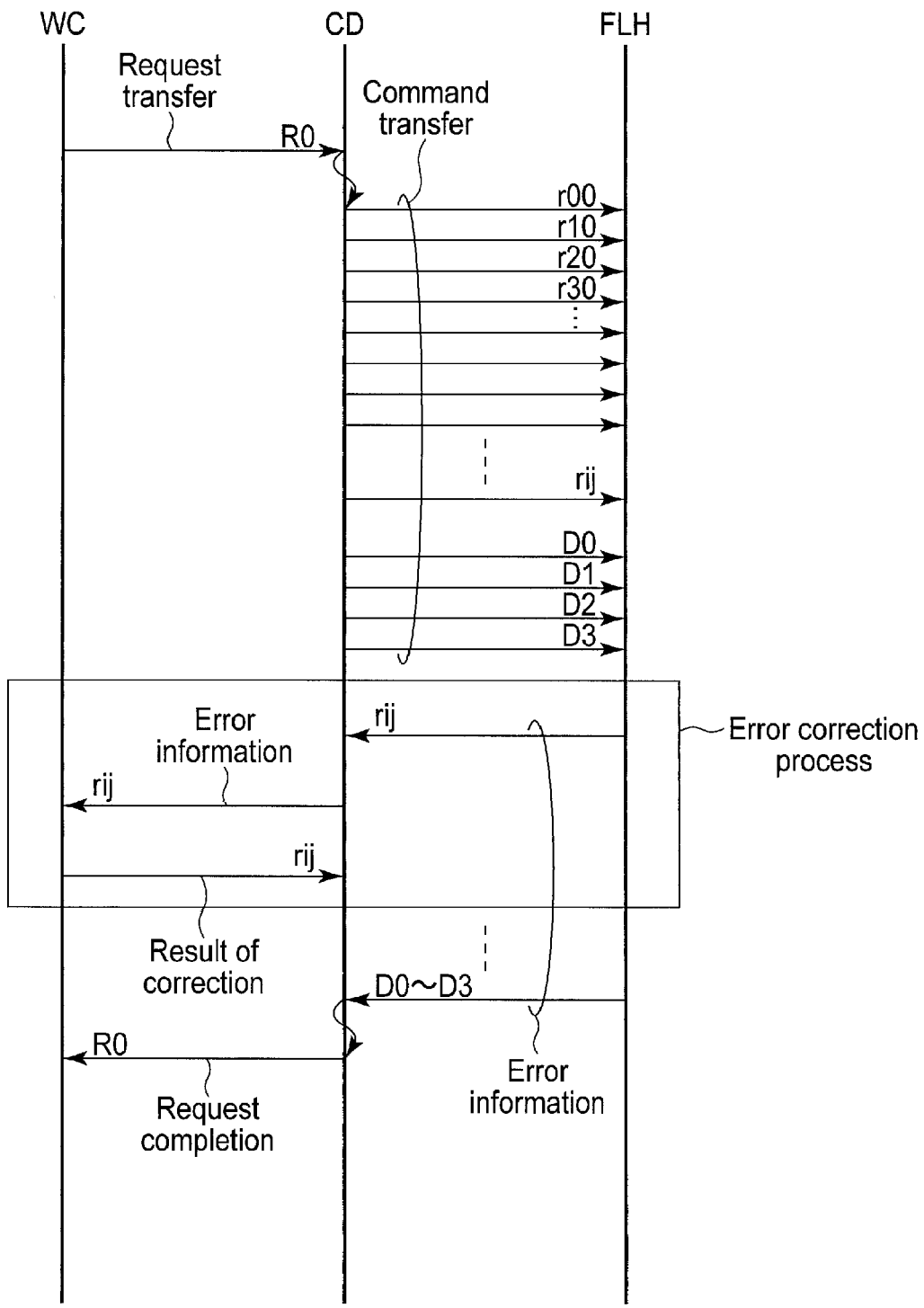
F I G. 6

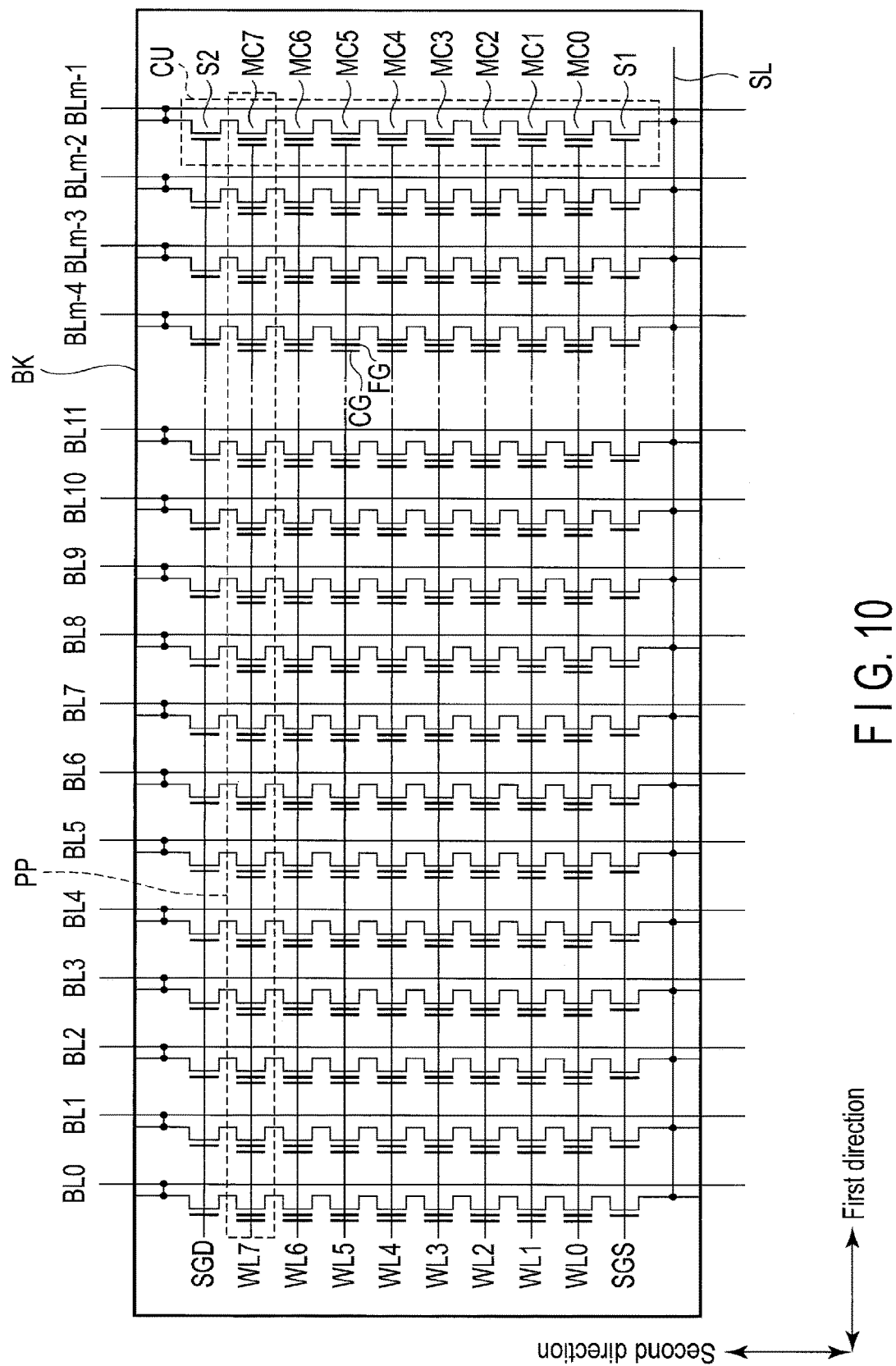
F I G. 10

MEMORY CONTROLLER AND MEMORY DEVICE

CROSS-REFERENCE TO RELATED APPLICATIONS

This application claims the benefit of U.S. Provisional Application No. 62/250,802, filed Nov. 4, 2015, the entire contents of which are incorporated herein by reference.

FIELD

Embodiments described herein relate generally to a memory controller and a memory device.

BACKGROUND

In a storage system including a nonvolatile memory and a memory controller that controls the memory, data is read from the nonvolatile memory in, for example, garbage collection and refresh.

BRIEF DESCRIPTION OF THE DRAWINGS

FIG. 2 is a diagram illustrating an example of a list of a plurality of read commands;

FIG. 3 to FIG. 6 are diagrams illustrating examples of command transfer between three controllers (CPU) WC, CD, and FLH;

FIG. 9 is a diagram illustrating an application example in which a memory device is an SSD; and FIG. 10 is a diagram illustrating an example of a NAND flash memory.

DETAILED DESCRIPTION

In general, according to one embodiment, a memory controller comprises: a first controller issuing one command which includes read commands for reading data from a nonvolatile memory; a second controller sequentially issuing the read commands and a dummy command which continues the read commands when the one command is received; and a third controller sequentially executing the read commands and the dummy command and reporting a read error to the second controller when one occurs, the second controller reporting a completion of the one command to the first controller when the command which corresponds to the read error is the dummy command.

EMBODIMENT

Figure 1:
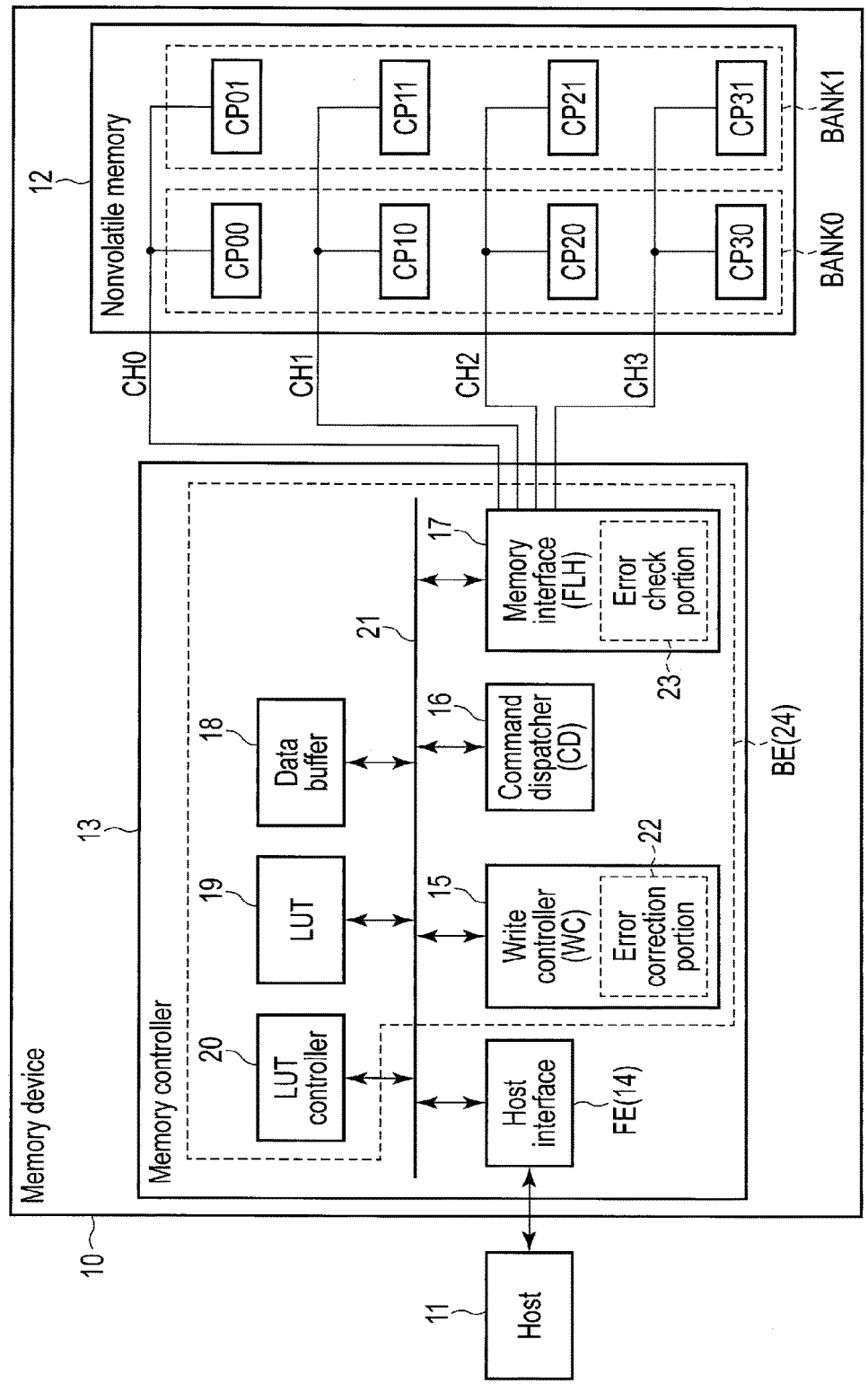
FIG. 1 is a diagram illustrating a storage system according to an embodiment.

FIG. 1 illustrates a storage system according to an embodiment.

A memory device 10 is a device that is connectable to a host 11. For example, the memory device 10 may be a solid-state drive (SSD) or a USB flash drive. The host 11 is an electronic apparatus such as a personal computer or a portable device. The host 11 may be an imaging device such as a digital still camera or a video camera or may be a tablet computer, a smartphone, a game console, a car navigation system, a printer, a scanner device, a server system or the like.

The memory device 10 includes a nonvolatile memory 12, and a memory controller 13 that controls the nonvolatile memory 12. The nonvolatile memory 12 is a memory that is capable of storing data in a nonvolatile manner, such as a NAND flash memory. The nonvolatile memory may include memory cells having a two-dimensional structure, or memory cells having a three-dimensional structure. The nonvolatile memory 12 may be a nonvolatile RAM such as a magnetic random access memory (MRAM), a resistive random access memory (ReRAM), and a ferroelectric random access memory (FeRAM).

The nonvolatile memory 12 includes a plurality of channels (four channels in the present example) CH0, CH1, CH2, and CH3, and a plurality of banks (two banks in the present example) BANK0 and BANK1.

Channels CH0, CH1, CH2, and CH3 are elements that are operable in parallel. For example, in parallel with read/write in one channel CH0, read/write can be executed in the other three channels CH1, CH2, and CH3. As described above, channels CH0, CH1, CH2, and CH3 achieve high-speed read/write.

Banks BANK0 and BANK1 are elements to execute an interleave operation. For example, each of the channels includes two chips. In this case, when read/write is busy (being executed) in chips CP00, CP10, CP20, and CP30 in bank BANK0, data transfer is executed between the memory controller 13 and chips CP01, CP11, CP21, and CP31 in bank BANK1. This operation enables efficient data transfer between the nonvolatile memory 12 and the memory controller 13.

The memory controller 13 controls read/write on the nonvolatile memory 12. The memory controller 13 controls read/write on the nonvolatile memory 12 in, for example, garbage collection and refresh, as well as the case of receiving a read/write command from the host 11. The garbage collection is rewriting distributed pieces of data together, and executed to increase free blocks (free space to which data can be written). The refresh is rewriting data in a physical block with increased read error occurrence rate to another physical block, and executed to reduce the read error occurrence rate. The free block is a block on which no valid data is recorded. For example, after valid data in a used block on which the valid data is recorded is moved by garbage collection or the like, all the data (valid/invalid data) in the used block is erased, and thereby the used block can be changed into a free block. The valid data is data associated with a logical address, and invalid data is data that is not associated with a logical address.

The memory controller 13 includes a front end FE (14), a back end BE (24), and a bus 21 that connects the elements. The front end FE (14) is a section that receives a read/write command from the host 11 and reports completion of the read/write command to the host 11. The front end FE (14) includes a host interface 14. The back end BE (24) is a section that controls read/write on the nonvolatile memory 12.

The back end BE (24) includes a write controller (WC) 15, a command dispatcher (CD) 16, a memory interface (FLH) 17, a data buffer 18, a look-up table (LUT) 19, and an LUT controller 20.

The write controller (first controller) 15 includes an error correction portion 22.

For example, when the front end FE (14) receives a write command from the host 11, the write controller 15 encodes user data from the host using the error correction portion 22, and transfers the encoded data as write data to the data buffer 18. When data is read from the nonvolatile memory 12, the write controller 15 decodes the read data using the error correction portion 22. The error correction portion 22 has a function of correcting an error, when any error exists in part of the read data, that is, when a read error occurs.

The error correction portion 22 may use any method as an encoding/decoding method. For example, the error correction portion 22 may use Reed Solomon (RS) coding, Bose Chaudhuri Hocquenghem (BCH) coding, or low-density parity check (LDPC) coding. The error correction portion 22 is disposed in the write controller 15, but is not limited thereto. The error correction portion 22 may be disposed separately from the write controller 15.

The write controller 15 issues a read/write command in an operation of, for example, garbage collection or refresh. In these operations, the write controller 15 reads valid data from a plurality of physical blocks in the nonvolatile memory 12, and rewrites the valid data to a new physical block.

For this reason, first, the write controller 15 issues a plurality of read commands to read valid data from a plurality of physical blocks serving as targets. One of characteristic points in the present example is that the write controller 15 is capable of consolidating a plurality of read commands into a batch command.

To achieve this, the write controller 15 constructs a list of read commands as a read unit from the nonvolatile memory 12.

Figures 2, 4:
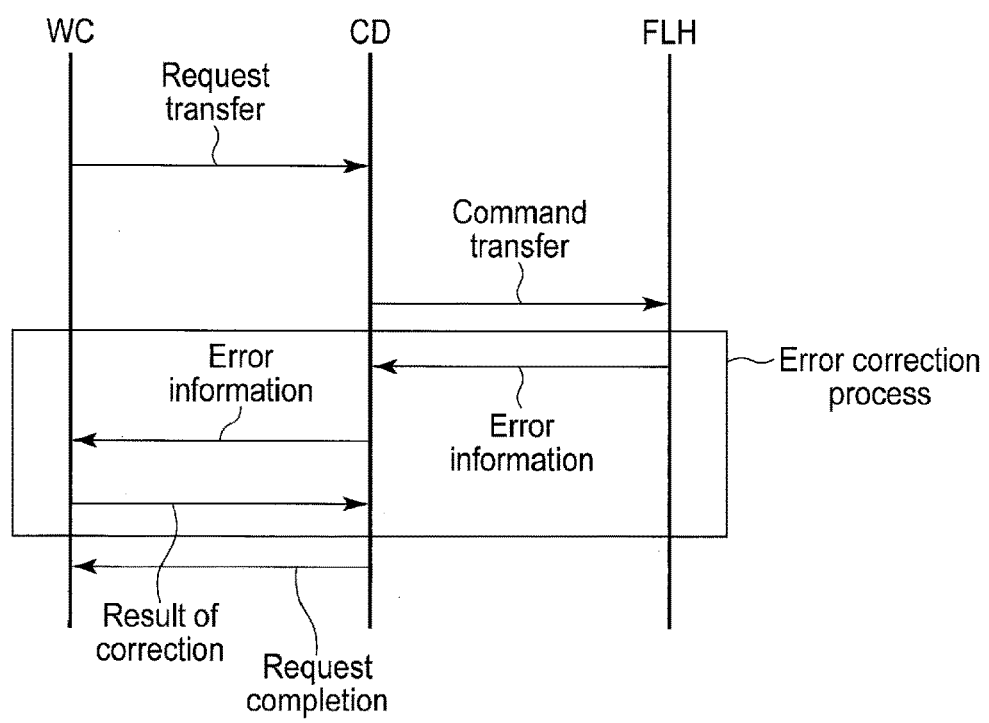

FIG. 2 illustrates an example of a list of read commands.

The example is an example in which a plurality of read commands r00, r10, r20, r30, . . . , rij are consolidated into a batch command R0. Each of address items MCA00, MCA10, MCA20, MCA30, . . . , MCAij includes all vectors necessary for accessing the memory cells, such as the bank, the channel, the block address, and the memory cell address of the nonvolatile memory 12.

As described above, processing a plurality of read commands consolidated into a batch command enables high-speed processing, because the processing reduces the overhead of data transfer per read command in comparison with the case of processing the read commands individually.

The command dispatcher (second controller) 16 functions as a command buffer. For example, as illustrated in FIG. 3, when the command dispatcher (CD) 16 receives a batch command R0 from the write controller (WC) 15, the command dispatcher (CD) 16 transfers read commands r00, r10, r20, r30, . . . included in the batch command R0 to the memory interface (FLH) 17.

The memory interface (third controller) 17 controls read/write on the memory cells in the nonvolatile memory 12. For example, the memory interface 17 stores a plurality of read commands from the command dispatcher 16, and sequentially executes the commands.

The memory interface 17 includes an error check portion 23. The error check portion 23 checks whether an error exists in part of the read data, that is, whether any read error occurs.

Figure 3:
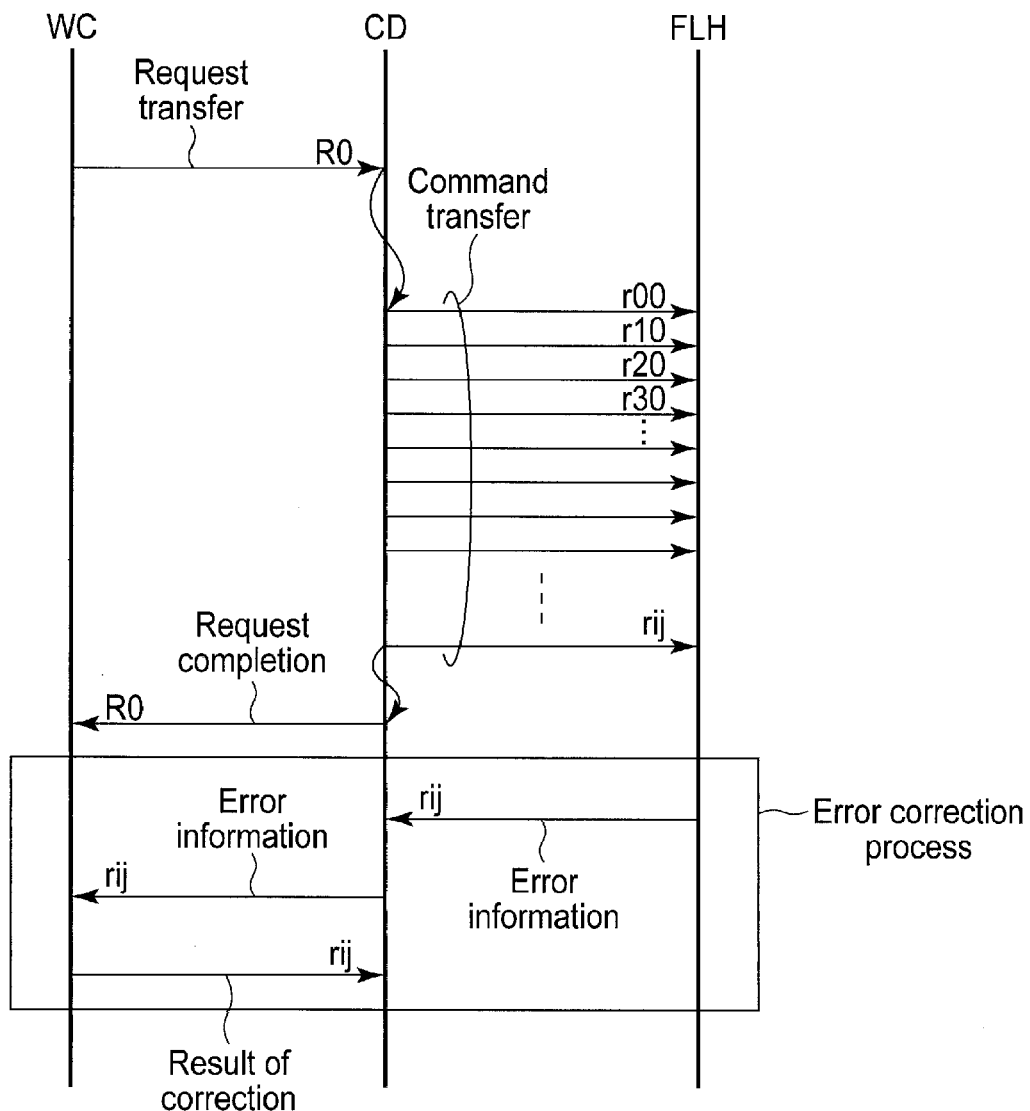

For example, as illustrated in FIG. 3, when a read error occurs in read command rij, the memory interface (FLH) 17 reports occurrence of a read error in read command rij to the command dispatcher (CD) 16. The command dispatcher (CD) 16 reports occurrence of the read error in read command rij to the write controller (WC) 15, to perform error correction by the write controller (WC) 15. The write controller (WC) 15 reports the result of error correction to the command dispatcher (CD) 16.

In the processing, as illustrated in FIG. 4, when the write controller (WC) 15 issues read commands in a read unit (cluster unit) of the nonvolatile memory 12, the overhead of data transfer per read command increases, because data transfer must be performed between the three controllers (WC, CD, FLH) for each of the read commands.

By contrast, as illustrated in FIG. 3, when the write controller (WC) 15 issues a batch command with a number N times (N is a natural number of 2 or more) as large as the read unit (cluster unit) of the nonvolatile memory 12, high-speed processing is enabled because the processing reduces the overhead of data transfer per read command.

In addition, as illustrated in FIG. 5, in the case of adopting an algorithm performing inquiry and acknowledgement as to whether a read command has been completed between the command dispatcher (CD) 16 and the memory interface (FLH) 17, the algorithm complicates the control in the memory controller 13, and easily causes a malfunction. In addition, the command dispatcher (CD) 16 must wait until it has received the acknowledgement before reporting completion of the batch command R0. For this reason, the inquiry and the acknowledgement cause loss of time, and delay reporting completion of the batch command R0.

For this reason, in the example illustrated in FIG. 3, the command dispatcher 16 determines that the read commands have been completed when the command dispatcher 16 finishes transferring read commands r00, r10, r20, r30, . . . , and immediately reports completion of the batch command R0 to the write controller 15. Even if the command dispatcher 16 reports completion of the batch command R0 to the write controller 15 after the command dispatcher 16 finishes transferring read commands r00, r10, r20, r30, . . . , no problem occurs because the read data should be stored in the data buffer when no read error occurs in read commands r00, r10, r20, r30, . . . .

However, if a read error occurs in, for example, the last read command rij in read commands r00, r10, r20, r30, . . . in the batch command R0, the command dispatcher (CD) 16 reports completion of the batch command R0 to the write controller (WC) 15 before correction of the read error has been completed.

Specifically, as illustrated in FIG. 3, the command dispatcher (CD) 16 transfers the last read command rij, and thereafter reports completion of the batch command R0 to the write controller (WC) 15. However, if a read error occurs in the last read command rij, the write controller (WC) 15 receives an error code from the memory interface (FLH) 17 through the command dispatcher (CD) 16. The write controller (WC) 15 performs error correction using the error correction portion 22, and reports the result of error correction (successful/unsuccessful) to the command dispatcher (CD) 16.

Originally, the command dispatcher (CD) 16 should report completion of the batch command R0 to the write controller 15 after receiving the result of error correction. However, as described above, the command dispatcher (CD) 16 reports completion of the batch command R0 to the write controller 15 when the command dispatcher 16 finishes transferring read commands r00, r10, r20, r30, . . . .

Accordingly, the command dispatcher (CD) 16 reports completion of the batch command R0 to the write controller 15 before receiving the result of error correction of the last read command rij. This means that the command dispatcher (CD) 16 is not capable of accurately reporting completion of the batch command R0 to the write controller 15.

For this reason, the command dispatcher (CD) 16 issues a command independently. The command is a dummy command that intentionally causes a read error by the memory interface 17. For example, as illustrated in FIG. 6, when the command dispatcher (CD) 16 receives a batch command R0 from the write controller (WC) 15, the command dispatcher (CD) 16 sequentially transfers read commands r00, r10, r20, r30, . . . included in the batch command R0 and dummy commands D0, D1, D2, and D3 following the read commands to the memory interface 17.

As described above, adding dummy commands D0, D1, D2, and D3 to the last of read commands r00, r10, r20, r30, . . . enables accurate reporting of completion of the batch command R0, even if a read error occurs in one of read commands r00, r10, r20, r30, . . . in the batch command R0.

For example, suppose that a read error occurs in execution of the last read command rij in read commands r00, r10, r20, r30, . . . in the batch command R0. In this case, the error correction portion 22 in the write controller (WC) 15 performs error correction on the data related to read command rij.

However, dummy commands D0, D1, D2, and D3 are executed after read commands r00, r10, r20, r30, . . . in the batch command R0. For this reason, the timing at which the command dispatcher (CD) 16 receives error codes related to dummy commands D0, D1, D2, and D3 from the memory interface (FLH) 17 is later than the timing at which the command dispatcher (CD) 16 receives the result of error correction of the read data related to read command rij from the write controller (WC) 15.

This structure enables the command dispatcher (CD) 16 to check whether all read commands r00, r10, r20, r30, . . . in the batch command R0 have been completed, by checking whether the commands related to the read error are dummy commands D0, D1, D2, and D3.

The data buffer 18 temporarily stores read data and write data. The data buffer 18 is, for example, a static random access memory (SRAM), or a dynamic random access memory (DRAM). The data buffer 18 may be a nonvolatile RAM such as an MRAM, a ReRAM, and a FeRAM. The data buffer 18 may be provided outside the memory controller 13.

The LUT 19 includes an address conversion table to convert a logical address designated from the host into a physical address of the nonvolatile memory 12. The LUT controller 20 performs address conversion using the LUT 19, and updates the LUT 19. The bus 21 mutually connects the host interface 14, the write controller 15, the command dispatcher 16, the memory interface 17, the data buffer 18, the LUT 19, and the LUT controller 20.

The write controller 15, the command dispatcher 16, and the memory interface 17 may be materialized as hardware, by execution of software with a built-in CPU, or as a combination thereof. It depends on the specific embodiment or design restrictions placed on the whole system whether the processing with the three controllers is achieved by hardware, software, or a combination thereof. For example, one skilled in the art can achieve processing of the three controllers with software or hardware by various methods according to respective specific embodiments, and all of them are included in the range of the present invention.

OPERATION EXAMPLE

The following is explanation of an operation example using the storage system of FIG. 1.

Figure 7:
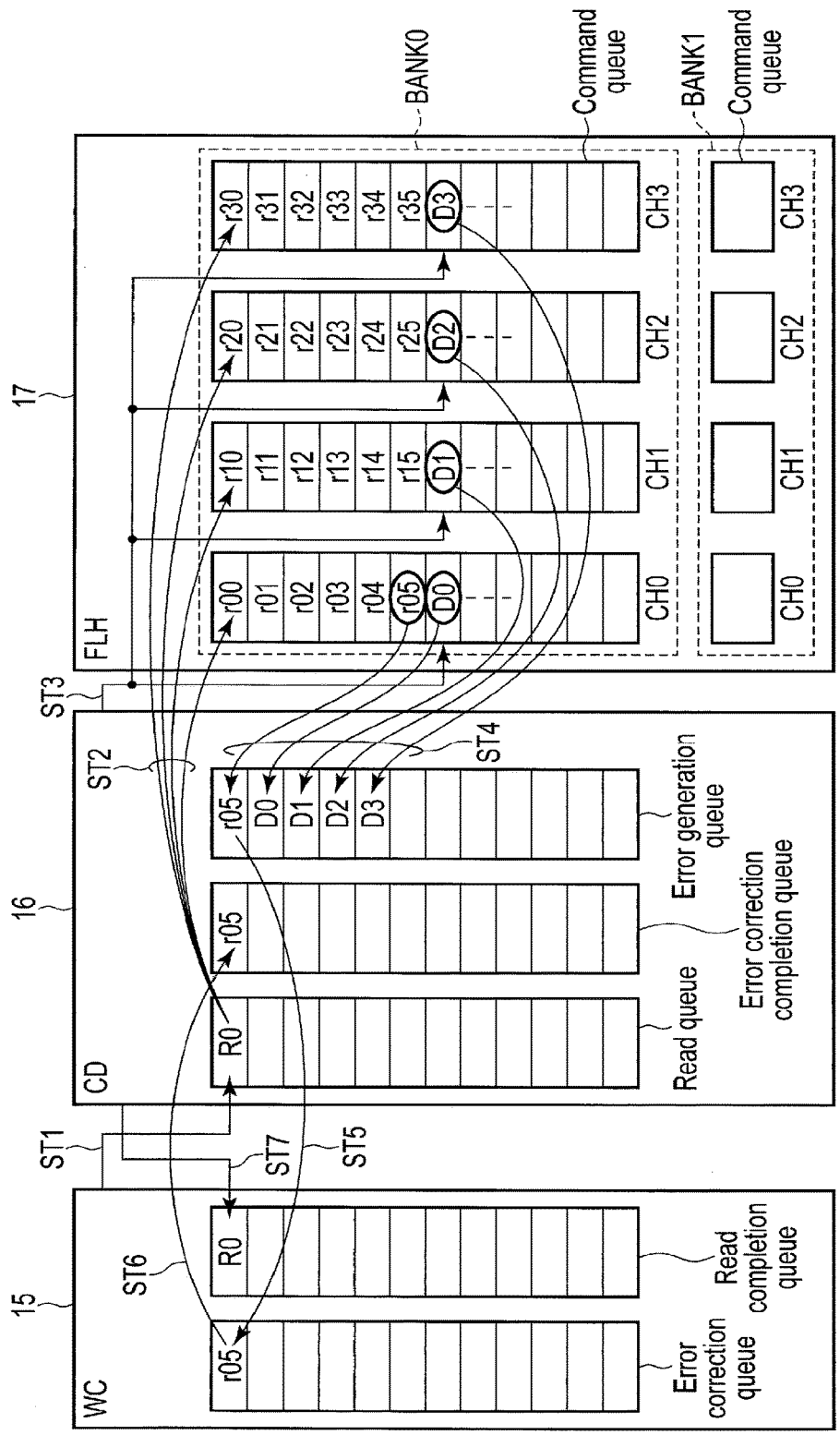
FIG. 7 is a diagram illustrating an operation example of the storage system of FIG. 1.
Figure 8:
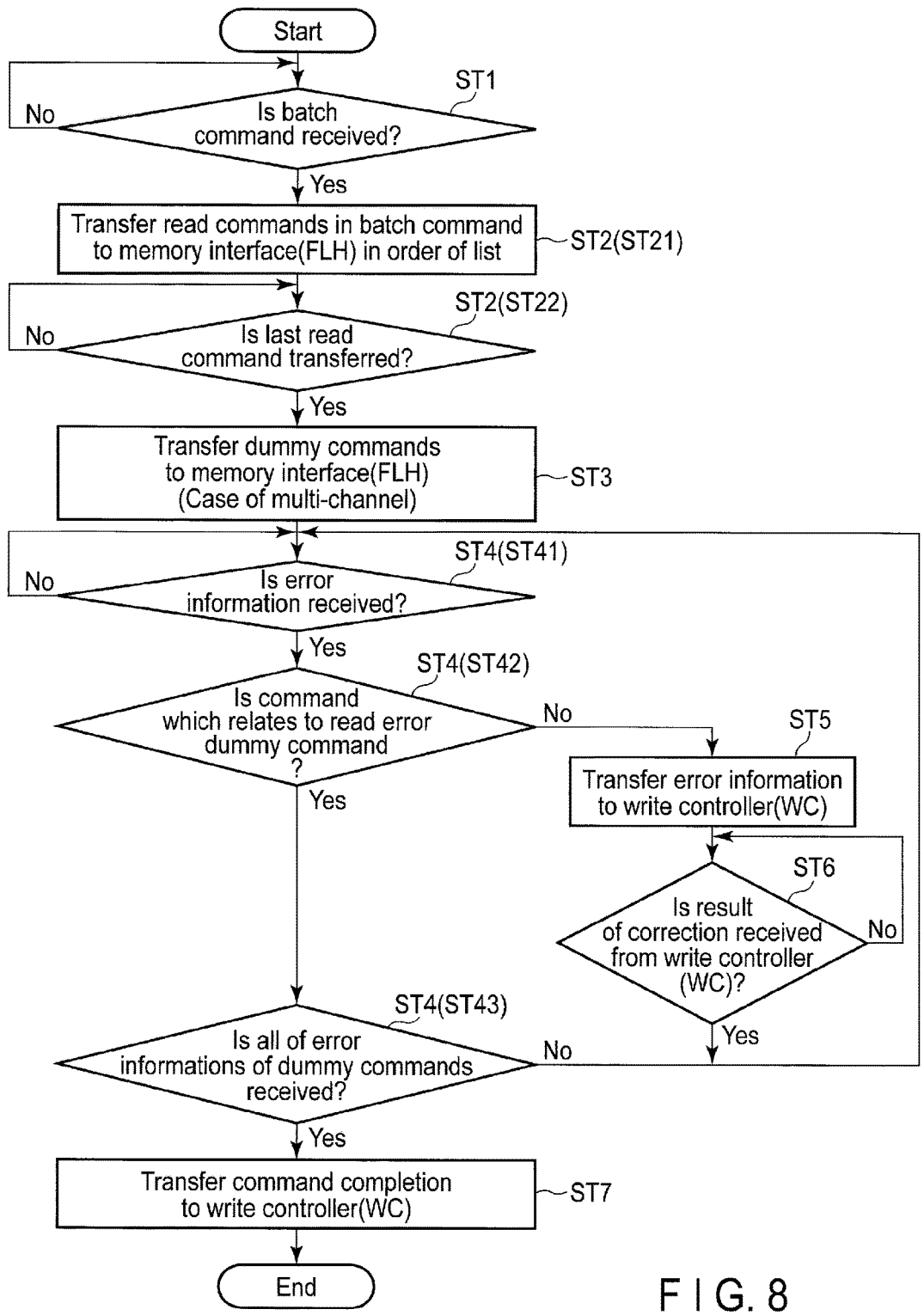
FIG. 8 is a diagram illustrating a flowchart of the operation example of FIG. 7.

FIG. 7 illustrates command or status transfer between the three controllers (WC, CD, and FLH) when data is read from the nonvolatile memory with a plurality of read commands such as garbage collection and refresh, in the storage system of FIG. 1. FIG. 8 illustrates a flowchart in the operation example of FIG. 7 as viewed from the command dispatcher (CD) 16. Steps S1 to S7 correspond to each other in FIG. 7 and FIG. 8.

First, the write controller (WC) 15 constructs a command list of, for example, the batch command R0 as illustrated in FIG. 2, and transfers the batch command R0 to the command dispatcher (CD) 16. The write controller (WC) 15 also stores the batch command R0 in a read queue. The command dispatcher (CD) 16 refers to the batch command R0 in the read queue, and thereafter transfers a plurality of read commands r00, r10, r20, r30, . . . , rij (i=0 to 3, j=0 to 5, in the present example) in the batch command R0 to the memory interface (FLH) 17, in accordance with the order indicated in the command list of the batch command R0 (Step ST1 to ST2 [ST21]).

In the present example, the nonvolatile memory serving as a read target includes two banks BANK0 and BANK1 and four channels CH0, CH1, CH2, and CH3, as illustrated in FIG. 1. In this case, read commands r00, r10, r20, r30, . . . , rij are sequentially accumulated in command queues in the memory interface (FLH) 17 that are provided in the respective banks or channels of the nonvolatile memory. The memory interface (FLH) 17 sequentially executes read commands r00, r10, r20, r30, . . . , rij accumulated in the command queues.

When the command dispatcher (CD) 16 verifies that the last read command rij in read commands r00, r10, r20, r30, . . . , rij is transferred, that is, all read commands r00, r10, r20, r30, . . . , rij are transferred, the command dispatcher (CD) 16 thereafter transfers dummy commands D0, D1, D2, and D3 to the memory interface (FLH) 17 (ST2 [ST22] to ST3).

In the processing, the command dispatcher (CD) 16 issues dummy commands D0, D1, D2, and D3 to the respective banks or channels of the nonvolatile memory. In the present example, the command dispatcher (CD) 16 issues four dummy commands D0, D1, D2, and D3 corresponding to the four channels CH0, CH1, CH2, and CH3, respectively, in bank BANK0.

Next, when the memory interface (FLH) 17 checks that a read error occurs in execution of read commands r00, r10, r20, r30, . . . , rij, the memory interface (FLH) 17 transfers an error code (a read command related to the read error) to the command dispatcher (CD) 16. Specifically, the memory interface (FLH) 17 stores the error code in an error generation queue (Step ST4 [ST41]).

The command dispatcher (CD) 16 also checks whether the command related to the read error is a dummy command (Step ST4 [ST42]).

If the command related to the read error is not a dummy command, the command dispatcher (CD) 16 transfers the error code to the write controller (WC) 15. Specifically, the command dispatcher (CD) 16 stores the error code in an error correction queue (Step ST5). For example, if the read command related to the read error is r05, r05 is stored in the error correction queue.

The write controller (WC) 15 refers to the error correction queue, and thereafter performs error correction (for example, error correction using RS coding). When the error correction has been completed, the write controller (WC) 15 deletes the read command related to the read error from the error correction queue, and reports the result of error correction to the command dispatcher (CD) 16. Specifically, the write controller (CD) 15 stores the result of error correction of read command r05 in an error correction completion queue (Step ST6).

The command dispatcher (CD) 16 verifies with the error correction completion queue that the error correction related to read command r05 has been completed, and thereafter checks whether any other error code is stored in the error generation queue (Step ST6 to ST4 [ST41]).

The above steps ST4 (ST42), ST5, and ST6 are performed again in this order, if another error code is stored in the error generation queue and the command related to the read error is not a dummy command.

By contrast, if another error code is stored in the error generation queue and the command related to the read error is a dummy command, the command dispatcher (CD) 16 reports completion of all read commands r00, r10, r20, r30, . . . , rij in the batch command R0 to the write controller (WC) 15, under the condition that all error codes related to dummy commands are stored in the error generation queue (Step ST4 [ST42], ST4 [ST43], and ST7).

Checking the error correction completion queue in the command dispatcher (CD) 16 shows whether all the error correction results are received from the write controller (WC) 15.

In the present example, a plurality of read commands in the batch command R0 are distributed to the four channels CH0, CH1, CH2, and CH3 in bank BANK0. For this reason, the four dummy commands D0, D1, D2, and D3 are provided to correspond to the four channels.

Accordingly, the command dispatcher (CD) 16 reports command completion to the write controller (WC) 15 when the command dispatcher (CD) 16 receives all error codes related to the four dummy commands D0, D1, D2, and D3. Specifically, the command dispatcher (CD) 16 stores the command completion report in a read completion queue.

The operation example described above enables reduction in overhead per read command, because a plurality of read commands r00, r10, r20, r30, . . . , rij are issued as one batch command R0. This structure enables improvement in performance of the storage system, and facilitates control in the storage system.

In addition, even when a read error occurs, issuing dummy commands D0, D1, D2, and D3 enables secure recognition of completion of all read commands r00, r10, r20, r30, . . . , rij in one batch command R0.

For example, if it is determined that all read commands r00, r01, r02, r03, r04, and r05 in bank BANK0 and in channel CH0 have been completed when transfer of read command r05 to the memory interface (FLH) 15 has been completed, command completion may be reported even though read command r05 has not been completed, in the case where a read error occurs in read command r05.

However, dummy command D0 is executed later than read commands r00, r01, r02, r03, r04, and r05 in bank BANK0 and in channel CH0. For this reason, the timing at which an error code related to dummy command D0 is reported to the command dispatcher (CD) 16 is later than the timing at which the result of error correction of the read data related to read command r05 is reported to the command dispatcher (CD) 16.

Accordingly, the command dispatcher (CD) 16 can verify completion of all read commands r00, r01, r02, r03, r04, and r05 in bank BANK0 and in channel CH0, by checking whether the command related to the read error is a dummy command D0.

APPLICATION EXAMPLE

FIG. 9 illustrates an application example in which the memory device 10 is an SSD. In FIG. 9, constituent elements that are the same as those in FIG. 1 are denoted by the same reference numerals.

The memory device (SSD) 10 includes a nonvolatile memory (NAND flash memory) 12, a memory controller (NAND controller) 13 that controls the nonvolatile memory, and a data buffer (DRAM) 18.

A plurality of commands transferred from the host 11 are registered in a queuing part in the memory controller 13 via a command decoder. Data related to the commands are temporarily stored in the data buffer 18. The commands registered in the queuing part in the memory controller 13 are sequentially processed based on tag numbers thereof.

FIG. 10 illustrates an example of the NAND flash memory.

The NAND flash memory includes a physical block BK.

The physical block BK includes a plurality of cell units CU that are arranged in the first direction. Each cell unit CU includes a memory cell string extending in the second direction crossing the first direction, a transistor (FET) S1 that is connected at one end of a current path of the memory cell string, and a transistor (FET) S2 that is connected at the other end of the current path of the memory cell string. The memory cell string includes eight memory cells MC0 to MC7 having current paths that are connected in series.

Each memory cell MCk (k=0-7) includes a charge storage layer (for example, a floating gate electrode) FG, and a control gate electrode CG.

Each cell unit CU includes eight memory cells MC0 to MC7 in the present example, but is not limited thereto. For example, each cell unit CU may include two or more memory cells, such as 32 memory cells and 56 memory cells. In addition, each of the memory cells may be of a type capable of storing one bit, or a type capable of storing two or more bits.

A source line SL is connected to one end of the current path of each memory cell string via a select transistor S1. A bit line BLm-1 is connected to the other end of the current path of the memory cell string via a select transistor S2.

Word lines WL0 to WL7 are connected in common with control gate electrodes CG of a plurality of memory cells MC0 to MC7 arranged in the first direction. In the same manner, a select gate line SGS is connected in common with gate electrodes of a plurality of select transistors S1 arranged in the first direction, and a select gate line SGD is connected in common with gate electrodes of a plurality of select transistors S2 arranged in the first direction.

Each physical page PP includes m memory cells that are connected to a word line WLi (i=0-7). Read/write of the nonvolatile memory is performed in the unit of physical page pp (corresponding to cluster), and erase is performed in the unit of physical block BK.

CONCLUSION

The embodiment described above enables reduction in overhead of command transfer per read command in transfer of read commands between a plurality of controllers (CPU). This enables improvement in performance of the storage system, and facilitates control in the storage system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller comprising:
a first controller issuing one command which includes a plurality of read commands, each of the plurality of read commands being a command for reading data from a nonvolatile memory;
a second controller sequentially issuing the plurality of read commands and a dummy command which follows the plurality of read commands when the one command is received, wherein the dummy command is configured such that a first read error occurs when the dummy command is executed; and
a third controller sequentially executing the plurality of read commands and the dummy command and informing information of a second read error to the second controller when the second read error is detected in the plurality of read commands executed,
wherein the second controller informs a completion of the one command to the first controller when the first read error occurs.

2. The memory controller of claim 1, wherein
the third controller detects the first read error by executing the dummy command.

3. The memory controller of claim 1, wherein
the first controller has a list of the plurality of read commands included in the one command.

4. The memory controller of claim 3, wherein
the first controller constructs the list when one of a garbage collection and a refresh is executed.

5. The memory controller of claim 1, further comprising a data buffer temporarily storing data which is read by the plurality of read commands.

6. The memory controller of claim 1, wherein
the third controller includes an error check portion checking the first read error and the second read error.

7. The memory controller of claim 1, wherein
the second controller informs the command which corresponds to the second read error to the first controller.

8. The memory controller of claim 7, wherein
the first controller includes an error correction circuit configured to correct the second read error, and informs a result of correction by the error correction circuit to the second controller.

9. The memory controller of claim 1, wherein
the nonvolatile memory comprises channels which are operable in parallel, and
the third controller queues the plurality of read commands and the dummy command every channel.

10. The memory controller of claim 9, wherein
the second controller informs the completion of the one command to the first controller when all of the first read errors by the dummy commands associated with the channels are confirmed.

11. A memory device comprising:
a nonvolatile memory; and
a memory controller controlling the nonvolatile memory, the memory controller comprising:
a first controller issuing one command which includes a plurality of read commands, each of the plurality of read commands being a command for reading data from a nonvolatile memory;
a second controller sequentially issuing the plurality of read commands and a dummy command which follows the plurality of read commands when the one command is received, wherein the dummy command is configured such that a first read error occurs when the dummy command is executed; and
a third controller sequentially executing the plurality of read commands and the dummy command and informing information of a second read error to the second controller when the second read error is detected in the plurality of read commands executed,
wherein the second controller informs a completion of the one command to the first controller when the first read error occurs.

12. The memory device of claim 11, wherein
the third controller detects the first read error by executing the dummy command.

13. The memory device of claim 11, wherein
the first controller has a list of the plurality of read commands included in the one command.

14. The memory device of claim 13, wherein
the first controller constructs the list when one of a garbage collection and a refresh is executed.

15. The memory device of claim 11, further comprising a data buffer temporarily storing data which is read by the plurality of read commands.

16. The memory device of claim 11, wherein
the third controller includes an error check portion checking the first read error and the second read error.

17. The memory device of claim 11, wherein
the second controller informs the command which corresponds to the second read error to the first controller.

18. The memory device of claim 17, wherein
the first controller includes an error correction circuit configured to correct the second read error, and informs a result of correction by the error correction circuit to the second controller.

19. The memory device of claim 11, wherein
the nonvolatile memory comprises channels which are operable in parallel, and
the third controller queues the plurality of read commands and the dummy command every channel.

20. The memory device of claim 19, wherein
the second controller informs the completion of the one command to the first controller when all of the first read errors by the dummy commands associated with the channels are confirmed.

* * * * *